United States Patent [19]

Kabuto et al.

[11] Patent Number: 5,487,439
[45] Date of Patent: Jan. 30, 1996

[54] REAR WHEEL STEERING DEVICE

[75] Inventors: Katsukuni Kabuto, Inuyama; Joji Otsuka, Kani, both of Japan

[73] Assignee: Kayaba Industry Co., Ltd., Tokyo, Japan

[21] Appl. No.: 192,387

[22] Filed: Feb. 7, 1994

Related U.S. Application Data

[63] Continuation of Ser. No. 875,043, Apr. 28, 1992, abandoned.

[51] Int. Cl.$^6$ .................................................. F16K 31/52
[52] U.S. Cl. ................................................ 180/79.1; 74/390
[58] Field of Search ........................... 180/79.1, 140; 280/91; 74/390, 87.14

[56] References Cited

U.S. PATENT DOCUMENTS

| | | | |
|---|---|---|---|
| 4,648,614 | 3/1987 | Hyodo | 180/141 X |
| 4,703,822 | 11/1987 | Kawamoto et al. | 180/140 |
| 4,741,409 | 5/1988 | Westercamp et al. | 180/140 X |
| 4,953,648 | 9/1990 | Ohmura | 180/140 X |
| 5,078,018 | 1/1992 | Saita et al. | 180/140 X |
| 5,131,485 | 7/1992 | Io et al. | 180/79.1 |

*Primary Examiner*—Margaret A. Focarino
*Assistant Examiner*—Victor E. Johnson
*Attorney, Agent, or Firm*—George J. Brandt, Jr.; Thomas R. Morrison

[57] ABSTRACT

A rear wheel steering device utilizes a hypoid gear wheel having a spherical bearing disposed eccentric to a center axis of the hypoid gear wheel. A stud shaft mounted to a rod has an end connected to the hypoid gear wheel via the spherical bearing so that rotation of the hypoid gear wheel moves the rod in an axial direction. The rod may then be jointed to the steering arms of a pair of wheels in order to steer them. This device is an improvement over the prior art in that it eliminates the costs of production required by a rack and pinion system, and the tensioning system therefor.

6 Claims, 5 Drawing Sheets

REAR WHEEL STEERING DEVICE

This is a continuation of application Ser. No. 07/875,043, filed on Apr. 28, 1992 and now abandoned.

BACKGROUND OF THE INVENTION

The present invention relates to a rear wheel steering device, and more particularly, to a rear wheel steering device having a transmission mechanism suitable for transmitting a rotational force of an electric motor to a rod in motor vehicle applications.

Prior art rear wheel steering devices use a rack and pinion driven through a hypoid gear from an electric motor. This mechanism requires initial contact backlash adjustment between the rack and the pinion, as well as additional adjustments to compensate for wear during use of the vehicle. The backlash adjustment requires additional parts and machining and the thrusts generated by the rack and pinion require expensive angular contact thrust bearings as well as a thrust bearing to absorb thrust forces in the hypoid gear shaft.

Initial backlash adjustment is undesirable because the apparatus to permit it, and the labor to accomplish it, adds to the cost of the rear wheel steering device. Periodic adjustment following use is undesirable since it interferes with easy use of the vehicle by the purchaser.

OBJECT AND SUMMARY OF THE INVENTION

It is an object of the present invention to provide a rear wheel steering device which can transmit the rotational force of an electric motor to a rod using a simple structure.

It is a further object of the invention to provide a rear wheel steering device in which a spherical bearing disposed eccentrically in a rotatable wheel transmits forces to a rod via a stud shaft mounted on the rod so as to move the rod in its axial direction.

Briefly stated, the present invention provides a rear wheel steering device that utilizes a hypoid gear wheel having a spherical bearing disposed eccentric to a center axis of the hypoid gear wheel. A stud shaft mounted to a rod has an end connected to the hypoid gear wheel via the spherical bearing so that rotation of the hypoid gear wheel moves the rod in an axial direction. The rod may then be jointed to the steering arms of a pair of wheels in order to steer them. This device is an improvement over the prior art in that it eliminates the costs of production required by a rack and pinion system, and the tensioning system therefor.

According to an embodiment of the invention, there is provided a steering device comprising: an electric motor, a gear wheel having an input side, an output side, and an axis of rotation, means for rotatably mounting the gear wheel in a casing, a spherical bearing disposed in the output side of the gear wheel, the spherical bearing being offset from the axis, means, responsive to the electric motor, for driving the gear wheel, a rod disposed beneath the output side of the gear wheel, a stud shaft mounted in the rod, and an end of the stud shaft engaging the spherical bearing whereby, when the gear wheel is rotated the rod moves in an axial direction.

The above, and other objects, feature and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
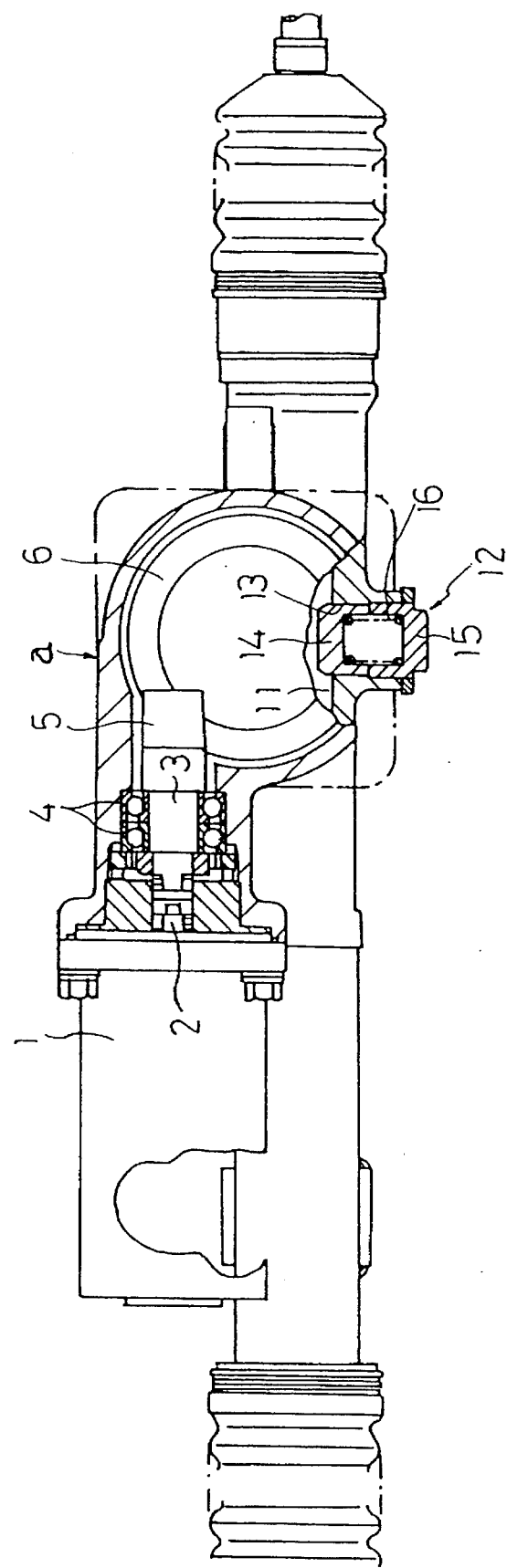
FIG. 1 is a sectional top view of a prior art.
Figure 2:
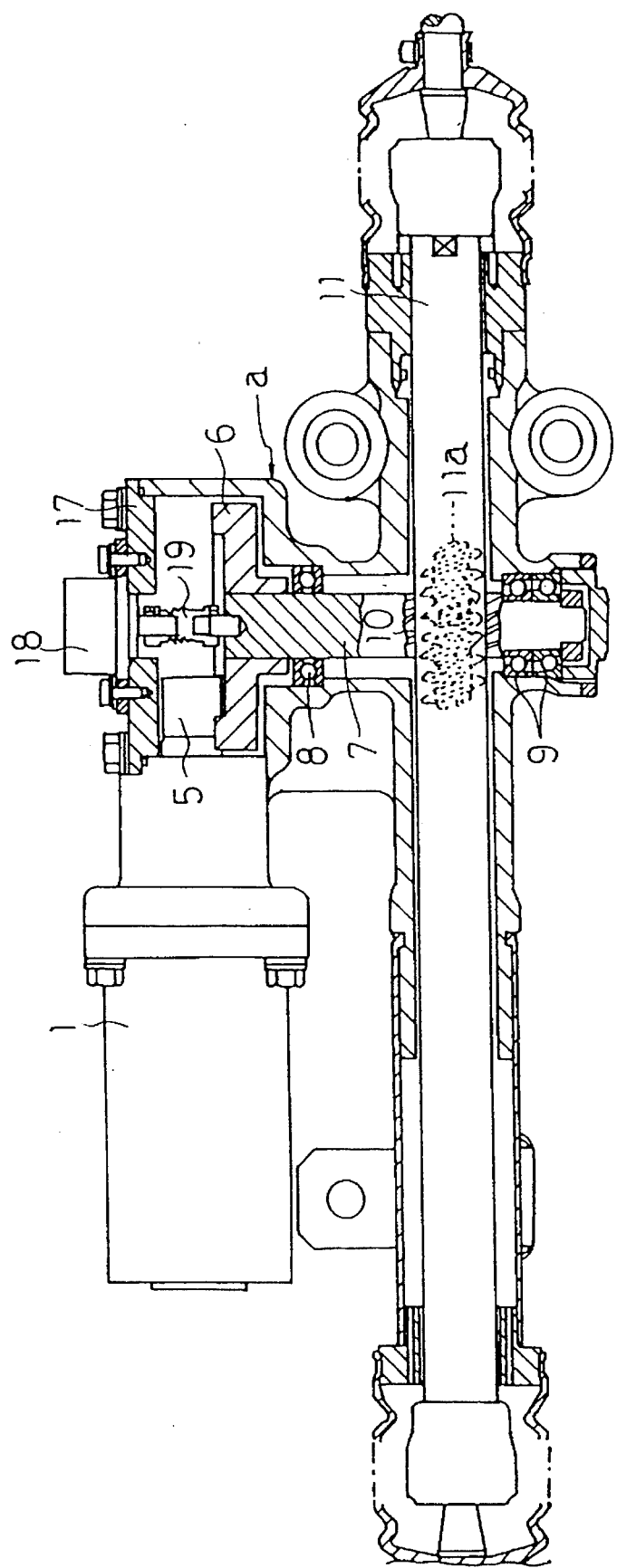
FIG. 2 is a sectional front view of a prior art.

Referring to FIGS. 1 and 2, a conventional rear wheel steering device employs an electric motor 1 attached to the end of a casing "a". An output shaft 2 of electric motor 1 is disposed within a hypoid pinion gear shaft 3. A plurality of angular contact thrust bearings 4, disposed between an outside circumference of hypoid pinion gear shaft 3 and the casing "a", allow the hypoid pinion gear shaft 3 to rotate freely and absorb thrust force. An end of a hypoid pinion gear shaft 3 includes a hypoid pinion gear 5 engaging a hypoid gear wheel 6 within casing "a".

As best shown in FIG. 2, the hypoid gear wheel 6 is mounted upon a pinion shaft 7. A bearing member 8 is disposed between the upper outside circumference of pinion shaft 7 and casing "a". A plurality of angular contact thrust bearings 9 are disposed between the lower outside circumference of pinion shaft 7 and casing "a". Bearing member 8 and angular contact thrust bearings 9 allow pinion shaft 7 to rotate freely. Angular contact thrust bearings 9 absorb thrust power applied to pinion shaft 7 by the rack 11a and pinion gear 10.

The pinion shaft 7 has a pinion gear 10 engaged with a rack 11a formed integrally with a rod 11 perpendicular to pinion gear 7. A bore 13 in casing "a" opposes pinion gear 10 at a right angle to rod 11. The bore 13 encompasses a rack holding mechanism 12 having a holding member 14 and an adjustment screw 15. The holding member 14 is slidably mounted in the bore 13 and has an inside edge face in contact with rod 11.

The adjustment screw 15 threaded into the bore 13 compresses a spring 16 against the holding member 14, thus applying a bias pressure against the rod 11 which adjusts the backlash of rack 11a and pinion gear 10.

Referring to FIG. 2, casing "a" has an aperture above the hypoid gear wheel covered with a cover member 17, upon which is attached a potentiometer 18. Potentiometer 18 is connected to pinion shaft 7 through a joint member 19 so that a rotational angle of pinion shaft 7 can be detected.

The electric motor 1 rotates the hypoid pinion gear shaft 3 thereby rotating hypoid gear wheel 6. Hypoid gear wheel 6 rotates pinion shaft 7. Rod 11 is thereby moved to either the right or the left, as shown in the figures, by the rotation of the pinion shaft 7. A rear wheel (not shown) can be steered through a steering arm (not shown by drawings) coupled to an end of rod 11.

The angle of rotation of pinion shaft 7 is transmitted to potentiometer 18 through joint member 19. The potentiometer 18 detects the angle of rotation of pinion shaft 7 and transmits a feedback signal to a controller (not shown).

Rack 11a is integrally formed with rod 11. Rack 11a engages pinion gear 10. The rotational force of electric motor 1 is transmitted to rod 11 to move rod 11 linearly in its axial direction. This conventional system entails the machining and production costs associated with manufacturing rack 11a on rod 11 and pinion gear 10 on pinion shaft 7. This machining or building process increases the cost of production of the system.

Also, the holding member 14 requires an initial adjustment of adjustment screw 15 following assembly and periodic adjustment thereof during use to minimize backlash of the rack 11a and the pinion gear 10 due to wear upon the pinion gear 10 and the rack 11a.

Additionally, the cost of production is further increased by the complexity of the structure involving a rack holding member.

The thrust force applied to the pinion shaft 7 in the conventional system requires the use angular contact thrust bearings 9 to support the pinion shaft 7. The installation and adjustment of the angular contact thrust bearings 9, still further increases the cost of the production for the system.

Figure 3:
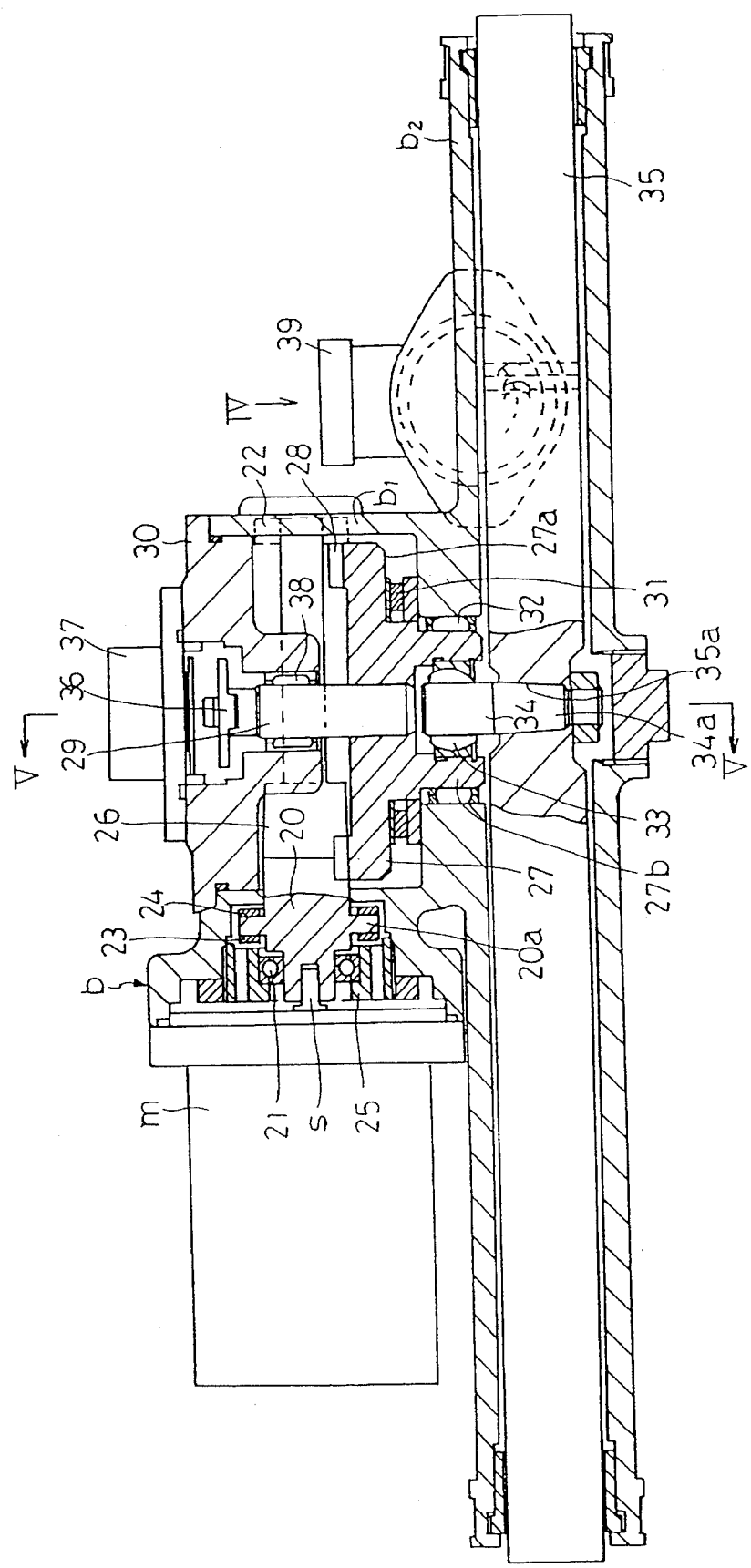
FIG. 3 is a sectional front view showing an embodiment of the present invention.
Figure 4:
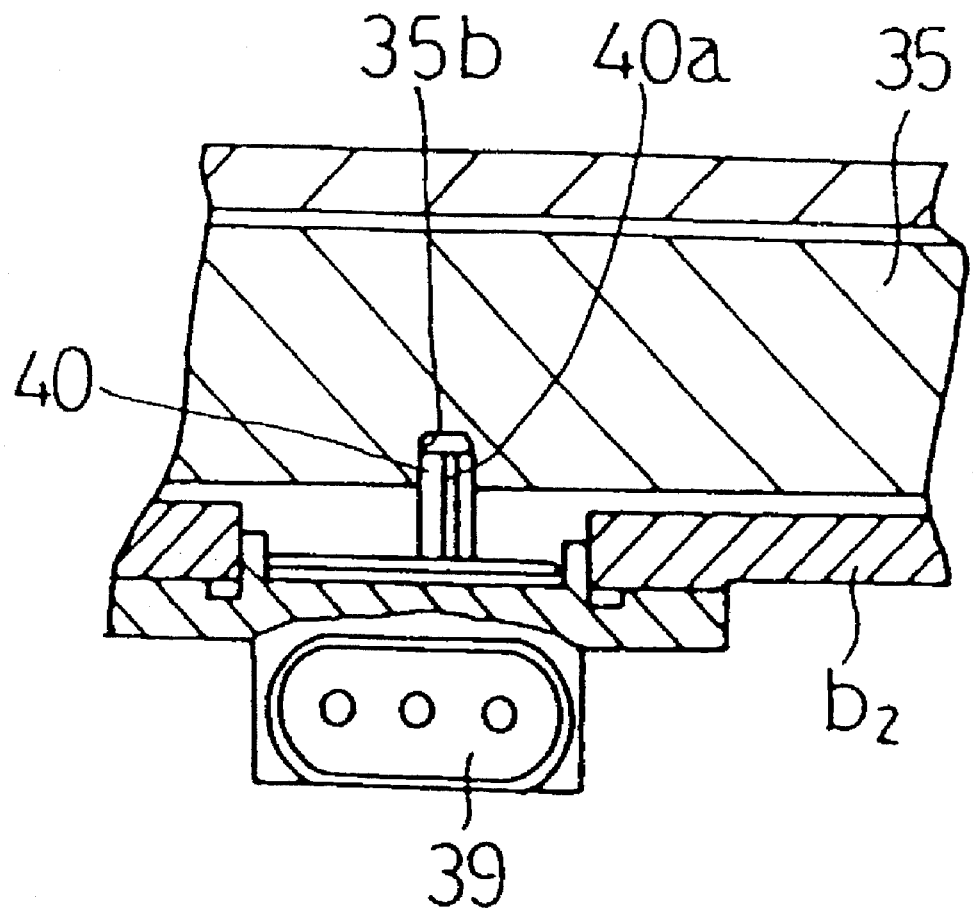
FIG. 4 is an enlarged sectional top view as shown by an arrow IV in FIG. 3.
Figure 5:
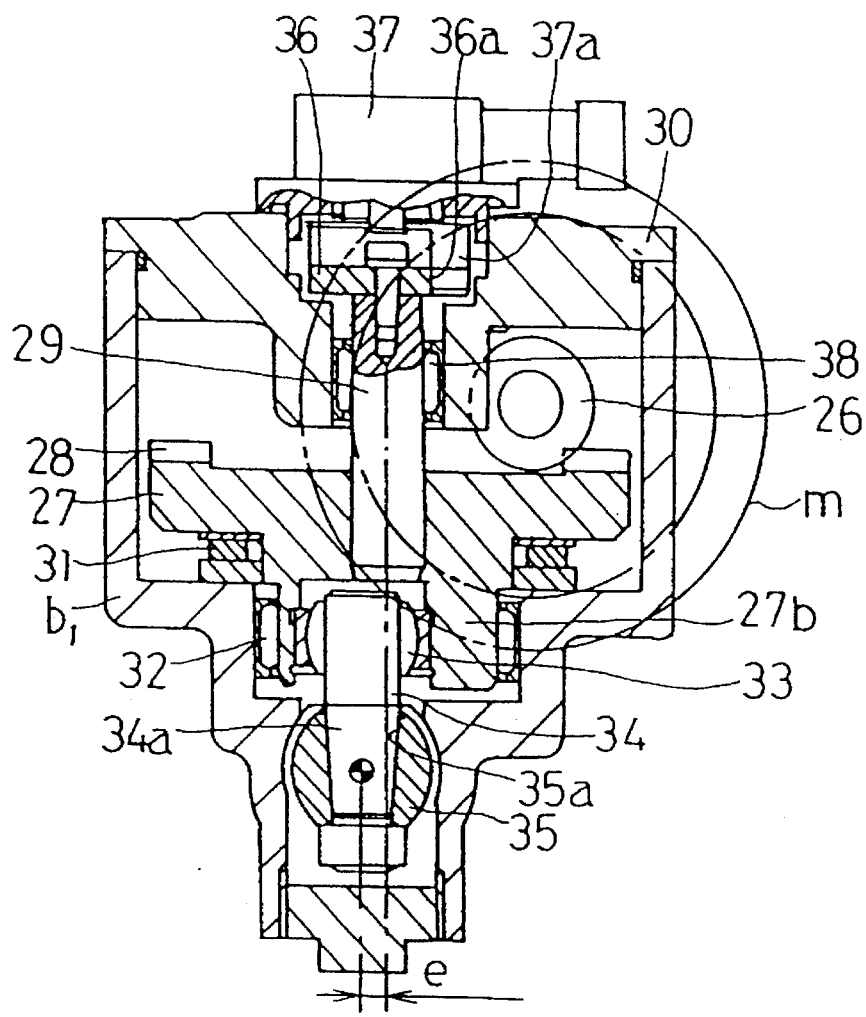
FIG. 5 is a sectional side view as shown by arrows V—V in FIG. 3.

Referring now to FIG. 3 an electric motor "m" is attached to an end of a casing "b" and has an output shaft "s" jointed to a hypoid pinion gear shaft 20. The hypoid pinion gear shaft 20 has a large diameter portion 20a with a first and a second angular faces. First bearing member 21 supports the hypoid pinion gear shaft 20 at a first end next to the motor "m". Second bearing member 22 supports the hypoid pinion gear shaft 20 at a second end. First bearing member 21 and second bearing member 22 absorb radial loads upon hypoid pinion gear shaft 20.

A thrust bearing member 23 is attached to the first end of a cylindrical face of a large diameter portion 20a. A second thrust bearing member 24 is attached to a second end of the cylindrical face large diameter portion 20a. A threaded adjustment collar 25 is attached on an outside circumference of bearing member 21 and is threaded within casing "b". An end of the threaded adjustment collar 25 abuts the first thrust bearing member 23 to apply pressure upon both the first and second thrust bearing members, 23 and 24, when the threaded adjustment collar is adjusted. Therefore, hypoid pinion gear shaft 20 rotates freely in first and second bearing members 21 and 22. The thrust forces upon the hypoid pinion gear shaft 20 are absorbed by the first and second thrust bearing members, 23 and 24.

Figure 6:
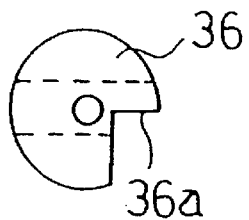
FIG. 6 is a top view of a plate body.

A hypoid pinion 26 on the hypoid pinion gear shaft 20 is engaged with a hypoid gear 28 attached to a hypoid gear wheel 27 in a gear box body $b_1$ (FIG. 6). A supporting shaft 29 is disposed within a gear side of the hypoid gear wheel 27. The gear box body $b_1$ has an aperture above the hypoid gear wheel 27. A top end of the supporting shaft 29 is inserted through a top bearing member 38 in a cover member 30 where it is freely rotatable about a center axis of the cover member 30. The cover member 30 is attached to the gear box body $b_1$ covering the aperture above the hypoid gear wheel 27.

Hypoid gear wheel 27 has a thrust bearing portion 31 between a step portion 27a on the output side of hypoid gear wheel 27 and gear box portion $b_1$. Bearing member 32 is disposed below step portion 27a between an outside circumference of a small diameter portion 27b of the hypoid gear wheel and gear box body $b_1$. The hypoid gear wheel 27 is thus supported by thrust bearing portion 31, bearing member 32 and top bearing member 38 Via supporting shaft 29.

A spherical bearing 33 is disposed within the small diameter portion 27b of hypoid gear wheel 27. The spherical bearing 33 has a center axis which is offset from the center axis of hypoid gear wheel 27 by a distance "e". A stud shaft 34, having a taper portion 34a, has the end disposed within spherical bearing 33. A rod 35, having a taper groove 35a, engages the stud shaft 34 via the insertion of the taper portion 34a into the taper groove 35a.

A plate body 36, having a notch portion 36a, is engaged at the top end of supporting shaft 29 connected to hypoid gear wheel 27. A potentiometer 37 is attached upon an upper side of the cover member 30, the cover member 30 having an aperture through which a lever member 37a of the potentiometer 37 protrudes. The lever member 37a engages the notch portion 36a of plate body 36. Lever member 37a is thus rotated as supporting shaft 29 is rotated.

Fail-safe operation while driving is ensured by a monitoring potentiometer 39. The rod 35 is enclosed in a rod casing having a rod case portion $b^2$ having an aperture exposing the rod 35 and a grove 35b therein. The monitoring potentiometer 39 is mounted over the aperture in the rod case portion $b_2$. The monitoring potentiometer 39 has a cylindrical lever member 40 having a slit 40a therein. An end of cylindrical lever member 40 is disposed within a groove 35b on the rod 35 so that lever member 40 moves with rod 35, thereby changing the resistance of potentiometer 39. Potentiometer 39 detects the amount of movement of rod 35 and outputs a signal proportional to the detected movement. This signal then serves as an actuating input to a fail-safe function during driving.

In the embodiment shown in FIG. 3 the hypoid pinion gear shaft 20 is rotated by the electric motor "m". The hypoid gear wheel 27 is rotated by the hypoid pinion gear shaft 20. The stud shaft 34, having an end disposed within a spherical bearing located in the small diameter portion 27b of the hypoid gear wheel eccentric to the axis of the hypoid gear wheel 27, is rotated around the center of the axis of the hypoid gear wheel 27. The stud shaft 34 moves the rod 35 in its axial direction. The spherical bearing 33 takes up movement in directions other than the axial direction of the rod 35 thus transmitting linear displacements in the axial direction of the rod 35 to the rod 35. The rod 35 is thus moved to the left or the right, in respect to the view shown in FIG. 3, by the stud shaft 34 and may therefore be used to steer a wheel (not shown) through a steering arm (not shown) connected to the rod 35. The rod 35 may therefore be used to steer a pair of vehicle rear wheels with steering arms, each steering arm being connected to an end of the rod 35.

The rotational angle of the hypoid gear wheel 27 is transmitted to the potentiometer 37 via the supporting shaft 29, the plate body 36 attached thereto, and the lever member 37a engaged with the plate body 36. The potentiometer 37 sends a feedback signal back to a controller (not shown) indicating the rotational angle of hypoid gear wheel 27.

The above described embodiment enables lower production costs to be achieved because the rack and pinion used in the prior art has been replaced by a rod with a stud shaft mounted in it where the stud shaft is eccentrically connected to a hypoid gear wheel by a spherical bearing. This eliminates the cost of producing a rack and a pinion gear to drive it which is greater than the cost associated with the production of the spherical bearing and rod mounted stud shaft of the above embodiment.

Also, the need for a rack holding mechanism for adjusting the joint backlash of the rack and pinion used in the prior art is eliminated in the above embodiment. This permits a further savings in production costs to be realized in the present invention by the elimination of parts and the simplification of the design. Likewise, the need for repeated adjustments of the rack holding mechanism due to wearing of the rack and pinion is eliminated.

Yet another improvement of the present invention is the elimination of the need for a pair of angular contact thrust bearings on the pinion shaft and the alignment thereof as is required in the prior art. The stud shaft arrangement of the present invention does not involve the use of axial forces on the stud shaft in the operation of the device. Thus, still further production cost savings result because the cost of the angular contact thrust bearings and their alignment is eliminated.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A wheel steering device comprising a drive motor having an output, a rotatably mounted gear wheel having an input side, an output side and a vertical axis of rotation, a spherical bearing mounted on the gear wheel at the output side of said gear wheel, the spherical bearing having a center axis offset from the gear wheel axis of rotation, a rod disposed proximal the output side of the gear wheel at a location below a location at which the spherical bearing is carried at said gear wheel output side, a stud shaft having an upper end part and a lower tapered end part, the stud shaft upper end part being received in said spherical bearing with a stud shaft axis coaxial with the spherical bearing axis, the stud shaft lower tapered end part being received fixed in a companionly configured tapered bore in the rod, and means drivingly coupling the drive motor output with the input side of said gear wheel thereby to rotate the gear wheel, the spherical bearing being drivingly connected with the gear wheel output side so that on rotation of said gear wheel drive is transmitted from the stud shaft to the rod to rotate said rod about a rod longitudinal axis and to slide it in a rod axial direction.

2. The wheel steering device of claim 1 in which the gear wheel output side is defined by a gear wheel lower part having an opening therein, the spherical bearing being fixed to the gear wheel in said opening.

3. A device according to claim 1 further comprising means for sending a feedback signal proportional to an angular position of said gear wheel.

4. A device according to claim 3 wherein said means for sending a feedback signal comprises:

a potentiometer; and means for coupling said potentiometer to said gear wheel such that said potentiometer is responsive to said angular position of said gear wheel to produce said feedback signal.

5. A device according to claim 1 further comprising means for sending a signal proportional to a position of said rod in said axial direction.

6. A device according to claim 5 wherein said means for sending a signal comprises:

a monitoring potentiometer; and means for connecting said monitoring potentiometer to said rod such that said monitoring potentiometer is responsive to said position of said rod in said axial direction.

* * * * *